Aug. 8, 1944.          G. L. ERICSSON          2,355,285
LOCKING DEVICE FOR SCREW JOINTS
Filed Nov. 28, 1940
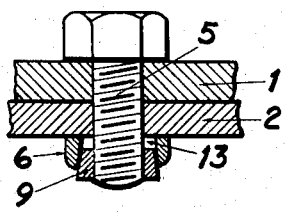
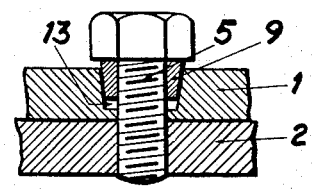
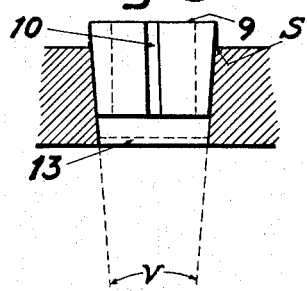
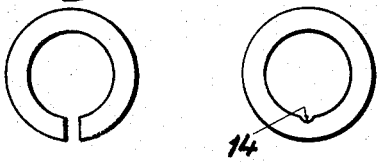
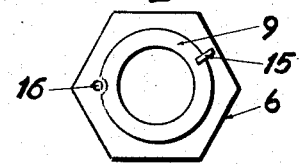
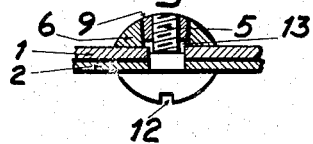
Inventor:
Gustaf Lambert Ericsson,
By Potter, Pierce & Scheffler
Attorneys Patented Aug. 8, 1944

2,355,285

UNITED STATES PATENT OFFICE 2,355,285

LOCKING DEVICE FOR SCREW JOINTS

Gustaf Lambert Ericsson, Traneberg, Sweden

Application November 28, 1940, Serial No. 367,661
In Sweden February 15, 1940

3 Claims. (Cl. 151—19)

My invention relates to improvements in nut locking devices for screw joints, and particularly to locking devices of the type including an externally tapered and longitudinally slitted sleeve with internal threads for engagement with the screw or bolt, and an outer seat member with a tapered bore in which the sleeve is seated.

An object of this invention is to provide a locking device of the type stated in which the axial dimensions of the sleeve and the seat member are such that the slit or kerf of the sleeve is completely closed by relative axial movement of the sleeve and the seat member before the smaller end face of the sleeve passes beyond or reaches the correspondingly located end face of the seat member. Another feature is that at normal tolerance of the threads, the width of the kerf is substantially equal to the difference between the greatest diameter of the conical sleeve and the greatest diameter of the aperture into which the sleeve is introduced.

Several experiments and tests have proved that the last-mentioned feature is a necessary condition for an effective and reliable locking of screw and nut, since the friction between the threaded sleeve and the screw is thereby prevented from being greater than that between the conical surfaces. When the joint is being tightened, i. e. when the nut or the screw is screwed inwards at increasing resistance, the diameter of the sleeve decreases until the slot closes, at which moment the squeezing action of the sleeve reaches its maximum. In other words, the pressure of the sleeve against the screw is limited, the sleeve being thereby prevented from eating its way into the screw. Thus, the sleeve may always be turned for further tightening of the joint even after the sleeve has started locking, provided, of course, that there is a sufficient space beneath the sleeve. To obtain a proper distribution of the frictional resistance between the threads on one hand, and between the conical surfaces on the other, it is also important that the angle subtended by diametrically opposed elements of the conical surface fall within certain limits.

Other features and advantages of my invention will appear from the following description and the accompanying drawing, wherein Figs. 1 and 2 are sectional side views of various joints provided with the locking according to my invention, Fig. 3 is a side view on a larger scale of the screw sleeve, shown in that position in a joint element which it assumes just before tightening the joint, Fig. 4 is an end elevation of a threaded sleeve;

Fig. 4a is an end elevation of a threaded sleeve prior to the cutting of the kerf;

Fig. 5 is a transverse sectional view through another embodiment of the invention;

Fig. 6 is a fragmentary detail showing a modified kerf construction; and

Fig. 7 is an end elevation of another embodiment of the invention.

Referring now to the drawing numerals 1 and 2 indicate two elements to be joined by a bolt or screw 5 and a cooperating locking device that includes a member 6 having a conical bore, and a conical, longitudinally slitted sleeve 9 that is internally threaded to engage the bolt or screw 5. The member 6 may take the form of a hexagonal body having the outer configuration of a conventional nut, as illustrated in Fig. 1; may be a domed body resembling a rivet head, as shown in Fig. 5; or the conical bore that is the essential feature of the member 6 may be provided by counterboring the members that are to be joined, as illustrated in Fig. 2. The conical surface of the separate member 6 or of the counterbore in one of the elements is designed for a close fit with the conical surface of the sleeve. The wall of the aperture preferably converges towards the joint. The sleeve, as usual, is slotted at 10 so that it can be compressed around the screw.

When applying the screw joint according to Fig. 1 the bolt 5 is passed through the apertures of the elements 1 and 2, and the nut 6, into which the sleeve 9 has been inserted, is screwed on to the bolt. When the bolt head and the nut reach contact with the elements 1 and 2, respectively, and the tightening is started, the sleeve 9 will rotate with the nut and at the same time be drawn into the nut. At continuous tightening the friction between nut and sleeve increases, and the sleeve is pressed radially against the bolt threads with increasing force. The angle $v$ of the cone, the width of the sleeve relatively to the bolt and to the aperture into which the sleeve is inserted, and the width of the slot 10 are so designed or selected that the slot closes during the tightening in order to ensure that the friction between the threads will never be greater than between the conical surfaces.

To illustrate an important condition for this effect reference is now made to Fig. 3. Before the tightening the sleeve 9 is pressed into its seat, which may be the nut 6 of Fig. 1 or the element 1 in Fig. 2. The width of the slot 10 shall be so selected that it is substantially equal to the difference between the greatest diameter of the conical sleeve and the greatest diameter of the opening into which the sleeve is introduced. It is also important that there is a free space 13 beneath the sleeve, i. e. between the sleeve and the element 2 after the tightening has been accomplished. Preferred values of the angle $v$ of the cone are 4–18°.

In the embodiment according to Fig. 2 there is a space 13 between the sleeve and the bottom of the seat even after the tightening.

The embodiment according to Fig. 5 differs from the above-mentioned embodiments as to the outer shape, which is like that of a rivet joint. The screw bolt 5 is rotated by means of a driver. A kerf 12 for the driver is provided in the head. This joint, for example, is suitable for sheet metal.

Fig. 4 shows how the walls of the kerf 10 may be rounded off inwardly to prevent the threads of the sleeve from cutting into the threads of the screw, whereby rotation of the sleeve around the screw would be stopped. This rounding-off may be carried out in such a manner that a groove 14 of greater width than the slot is made in the sleeve at the zone where the slot is to be cut (Fig. 4a). Fig. 6 shows how the slot 10 can be cut obliquely through the wall of the sleeve.

If it is desired to make the locking still safer, the sleeve and the surrounding wall may be brought into a special engagement with one another, for example quite simply by making a mark in the two portions by means of a punch or driver, as indicated in Fig. 7 at 15 and 16, respectively.

The effectivity of the locking device to a certain degree also depends upon the thickness of the material of the sleeve; the same may preferably be at least half the radial thickness of the material of the nut. Further, it is suitable to give the screw sleeve another degree of hardness or to make the same of another material than the surrounding material so as to obtain a greater friction between the conical surfaces. For the same reason the conical surfaces may be provided with longitudinal flutes.

With regard particularly to the degree of hardness it has proved advantageous, for example, to harden the nut, especially the conical surface, since the same then makes a greater resistance against expansion at the tightening of the nut and, consequently, gives a still more effective locking.

The described embodiments of the invention are distinguished from prior locking devices of the same general type in that they satisfy, simultaneously, the two conditions that are essential for a progressive increase in the clamping pressure during the tightening of the threaded connection. The smaller end surface of the conical threaded element must not engage a stationary stop surface during the tightening operation, and the clamping pressure of the sleeve 9 upon the screw or bolt 5 should create a maximum frictional resistance to relative rotation that is not in excess of the frictional resistance to relative rotation of the complementary conical surfaces of the member 6 and the sleeve 9. The taper of the conical surfaces determines not only the rate at which the kerf 10 is closed by the relative rotation of sleeve 9 and bolt 5 but also the frictional resistance to relative rotation of the engaged conical surfaces. The maximum clamping pressure of the sleeve 9 on the threaded member 5 is determined by so selecting the width of the kerf 10, with respect to the initial, maximum diameter of the sleeve 9, that the kerf is completely closed before the friction due to clamping pressure exceeds the frictional resistance to relative rotation of the engaged conical surfaces. It is therefore impossible for the sleeve 9 to lock to the bolt 5, with a resultant ineffective rotation of sleeve 9 within the member 6, before the tightening operation is completed. Furthermore, the parts are so designed that there is always a free space 13 between the smaller diameter end of the sleeve 9 and the base of the conical bore in which the sleeve is seated. This condition is essential to the obtaining of the maximum clamping pressure that can be established within the range of progressive increase in clamping pressure.

Having now described my invention, what I claim as new and desire to secure by Letters Patent is:

1. A lock nut adapted for use with a screw threaded bolt or the like comprising an externally uniformly frusto-conical, internally screw threaded, longitudinally slotted sleeve, adapted to run on the threads of the bolt, a member having an opening defined by a uniformly frusto-conical wall adapted to engage the outer conical wall of said sleeve in seating position, the angles of said walls being substantially equal and within the range from 4° to 18°, characterized in that the width of the slot is such that the slot is closed in tightening to give a predetermined pressure on the bolt and to leave a free space between the smaller diameter end of the sleeve and the smaller diameter end of said opening.

2. Lock nut as defined in claim 1 in which the width of the slot is substantially equal to the difference between the greatest diameter of the sleeve and the greatest diameter of the opening.

3. Lock nut as defined in claim 1 in which the minimum thickness of the sleeve is at least about half the radial thickness of the nut member.

GUSTAF LAMBERT ERICSSON.